Nov. 20, 1934.  J. DONADEI  1,981,785

TRAP

Filed June 30, 1933

Inventor
JOSEPH DONADEI
By Victor J. Evansko
Attorneys.

Patented Nov. 20, 1934

1,981,785

UNITED STATES PATENT OFFICE 1,981,785

TRAP

Joseph Donadei, Los Gatos, Calif.

Application June 30, 1933, Serial No. 678,502

1 Claim. (Cl. 43—85)

This invention relates to improvements in traps and has particular reference to an animal trap, especially adapted to catch moles.

The principal object of the invention is to provide a trap which may be utilized for the purpose of catching preferably small animals and particularly that type of animal which burrows or lives in holes which are as a rule inaccessible.

A further object is to produce a device which is economical to manufacture.

Another object is to produce a trap which may be placed within the hole in which the animal lives.

An additional object is to produce a device which may be readily set and placed in operative position without danger of the operator being injured.

A still further object is to produce a device which may be operative irrespective of the position in which it is placed after being set.

Other objects and advantages will be apparent during the course of the following description.

Figure 1:
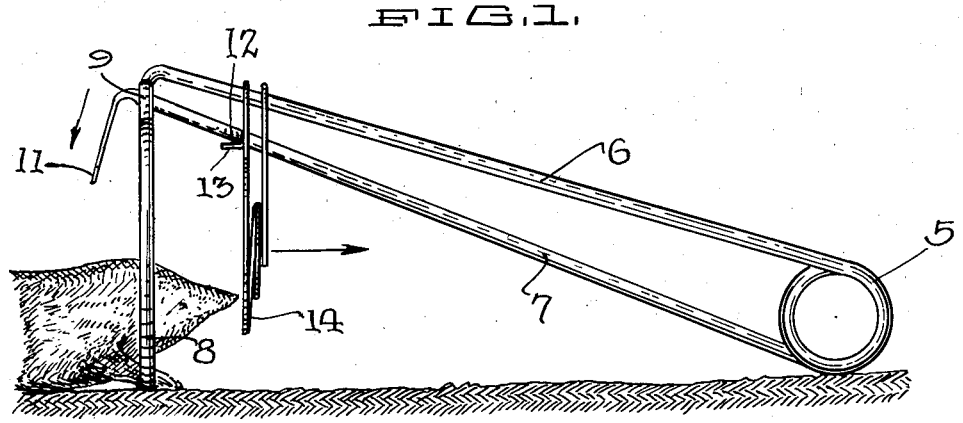
Figure 2:
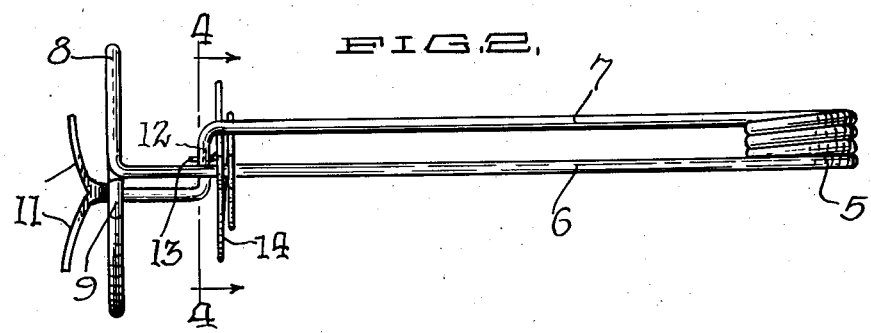
Figure 3:
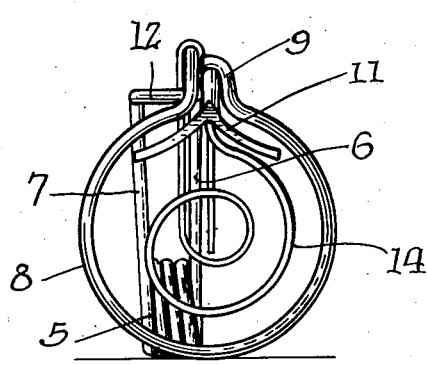
Figure 4:
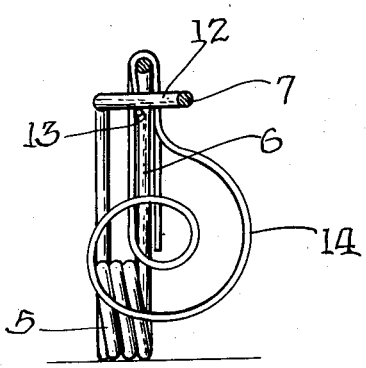

In the accompanying drawing forming a part of this specification and in which like numerals are employed to designate like parts throughout the same, Fig. 1 is a side elevation of my device as the same would appear in use, Fig. 2 is a top plan view of Fig. 1, Fig. 3 is an end elevation of Fig. 1, and Fig. 4 is a cross sectional view on the line 4—4 of Fig. 2.

Various rodents, such as moles, gophers, field mice and the like cause considerable damage through the eating of farm products, and these animals, due to the fact that they are burrows, are often hard to catch. Applicant has, therefore, devised a trap which may be inserted in the burrow, which trap will catch the animal and cause death thereto. At the same time applicant has devised such a trap that the portion entering the burrow is circular in cross section and therefore may be readily placed within the burrow, and further applicant's trap is such that it does not materially matter what position the trap is placed in, as it is operative irrespective of the manner in which it is inserted in the burrow.

In the accompanying drawing wherein for the purpose of illustration is shown a preferred embodiment of my invention, the numeral 5 designates a relatively strong coiled spring having arms 6 and 7. The arm 6 is bent so as to form a loop 8 through which the animal's head passes. The arm 7 extends through an offset portion 9 formed in the loop 8 and has its end bifurcated as shown at 11. The bifurcated ends are so formed and so positioned that they will engage the neck of the animal after it has passed through the loop 8. It will be noted that the arm 6 is provided with a portion 12 which is at right angles to the major portion of the arm. This portion 12 is adapted to overlie the end 13 of a trigger which is formed of a wire 14 slidable on the arm 6 and so coiled as to represent a worm.

When the parts are in the position of Fig. 1 and the animal places the head through the loop, the nose engaging the coiled wire 14 will cause the end 13 to move out from beneath the horizontal portion 12 and immediately the spring 5 will cause the bifurcated portion 11 to impinge upon the back of the neck with the result that the head is caught between the lower portion of the loop 8 and bifurcated extension 11.

It will thus be seen that my device will accomplish all the objects above set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:—

In a device of the character described, a spring having a pair of substantially parallel arms, one of said arms having a loop formed at its end and angularly disposed with relation thereto, the other of said arms extending through said loop and having its end bifurcated, said last mentioned arm having an offset formed therein parallel with the plane of said loop, a trigger slidable on said loop carrying arm, said trigger being capable of engaging the offset portion of said other arm, and a coil formed integral with said trigger, whereby contact with said coil will actuate said trigger to spring said trap.

JOSEPH DONADEI.